United States Patent [19]

d'Alayer de Costemore d'Arc

[11] Patent Number: 4,520,470

[45] Date of Patent: May 28, 1985

[54] CLEANING DEVICE FOR DISCS

[75] Inventor: Stephane d'Alayer de Costemore d'Arc, Brussels, Belgium

[73] Assignee: Staar S. A., Brussels, Belgium

[21] Appl. No.: 521,260

[22] Filed: Aug. 8, 1983

[30] Foreign Application Priority Data

Nov. 29, 1982 [BE] Belgium ............................ 0/209.596
Apr. 7, 1983 [BE] Belgium ............................ 0/210.503

[51] Int. Cl.³ ................................................ F11B 3/58
[52] U.S. Cl. ..................................... 369/72; 15/97 R; 15/DIG. 14; 206/310; 360/133; 360/137
[58] Field of Search ............... 369/72; 15/21 R, 21 B, 15/97 R, DIG. 14; 206/309, 310, 312, 313; 360/137, 133

[56] References Cited

U.S. PATENT DOCUMENTS

| | | | |
|---|---|---|---|
| 1,339,700 | 5/1920 | George | 15/246 |
| 3,062,552 | 11/1962 | Schwatz | 206/309 |
| 3,668,658 | 6/1972 | Flores et al. | 396/72 |
| 3,747,942 | 7/1973 | Hammond | 369/72 |
| 3,774,757 | 11/1973 | Harris et al. | 369/72 |
| 4,084,690 | 4/1978 | Pulse | 206/310 |
| 4,101,948 | 7/1978 | Tadokoro et al. | 369/72 |
| 4,101,999 | 7/1978 | Doyel | 15/21 B |
| 4,107,810 | 8/1978 | Varni et al. | 15/97 R |
| 4,392,170 | 7/1983 | Okada | 360/133 |

FOREIGN PATENT DOCUMENTS

| | | |
|---|---|---|
| 1291531 | 3/1969 | Fed. Rep. of Germany . |
| 1396859 | 5/1964 | France . |
| 2383499 | 3/1978 | France . |
| 129002 | 11/1978 | Japan .................................. 206/309 |
| 1055964 | 1/1967 | United Kingdom . |
| 1410020 | 3/1970 | United Kingdom . |

Primary Examiner—Steven L. Stephan
Attorney, Agent, or Firm—Leydig, Voit, Osann Mayer and Holt, Ltd.

[57] ABSTRACT

A disc or record cleaning device especially for laser-read discs having digital recordings is provided in a disc storage container and incorporates a cleaning member with which the disc or record is brought into contact so as to clean the disc by a relative movement with respect to the cleaning member. The cleaning member is a fibrous pad and is either fixed and the disc rotated or the disc is held stationary and the cleaning pad rotated or translated. The storage container is provided by sections movable relative to one another, either articulated about a common pivot or translatable. The relative movement of the sections is coupled to move the disc and cleaning member relatively for cleaning the disc.

21 Claims, 15 Drawing Figures

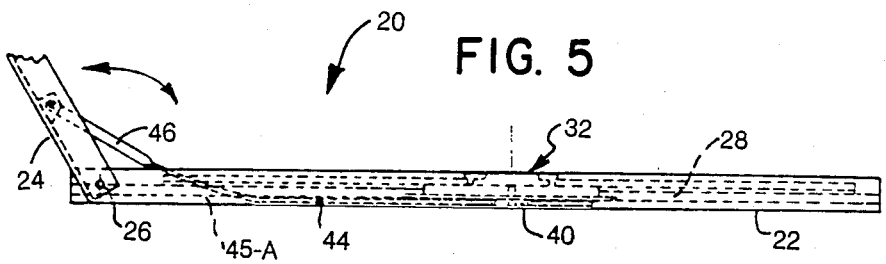
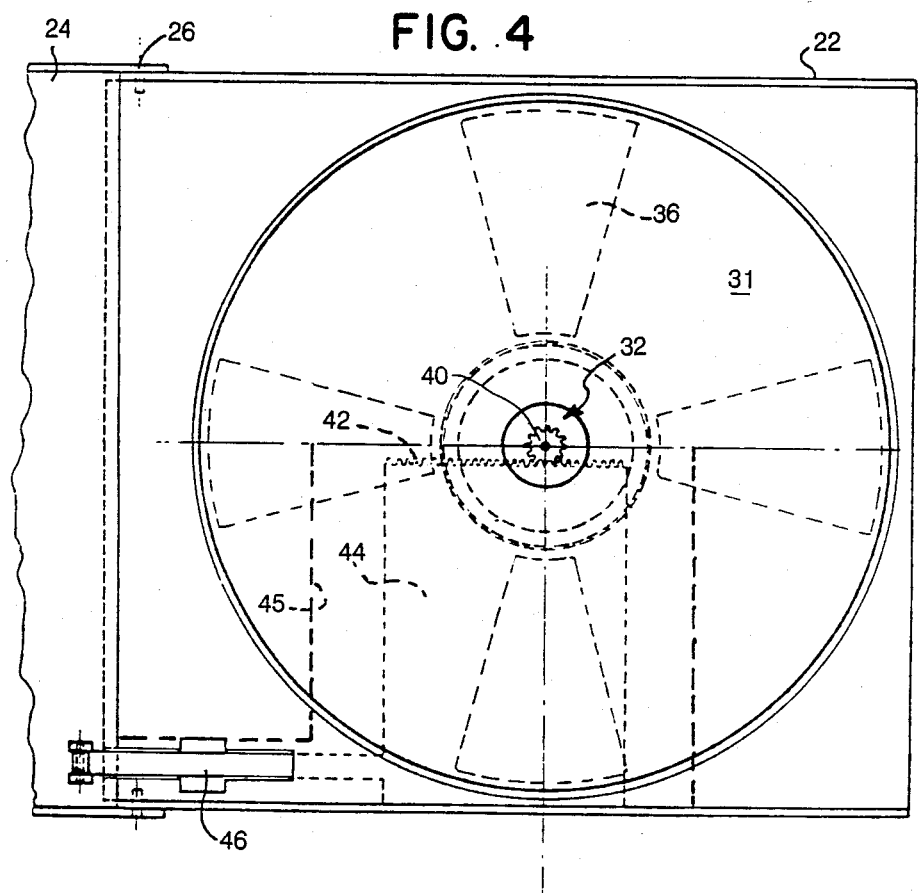

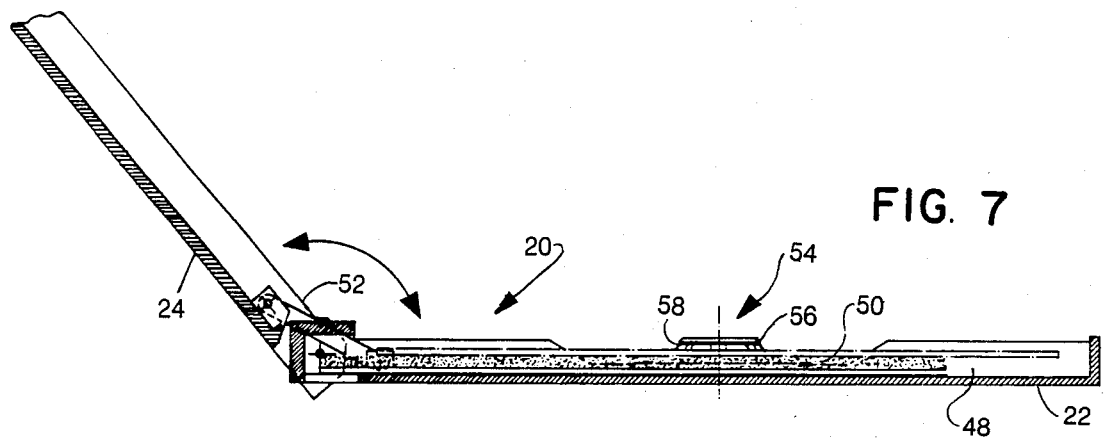
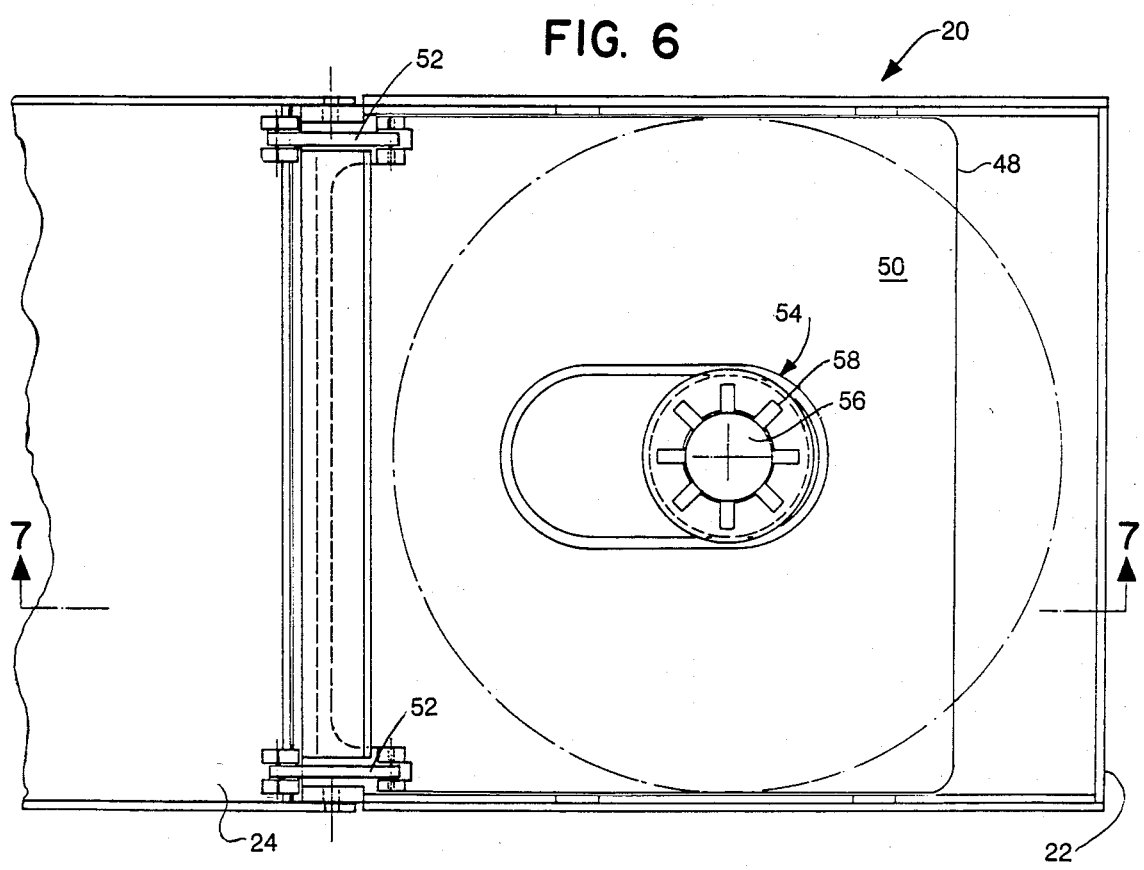

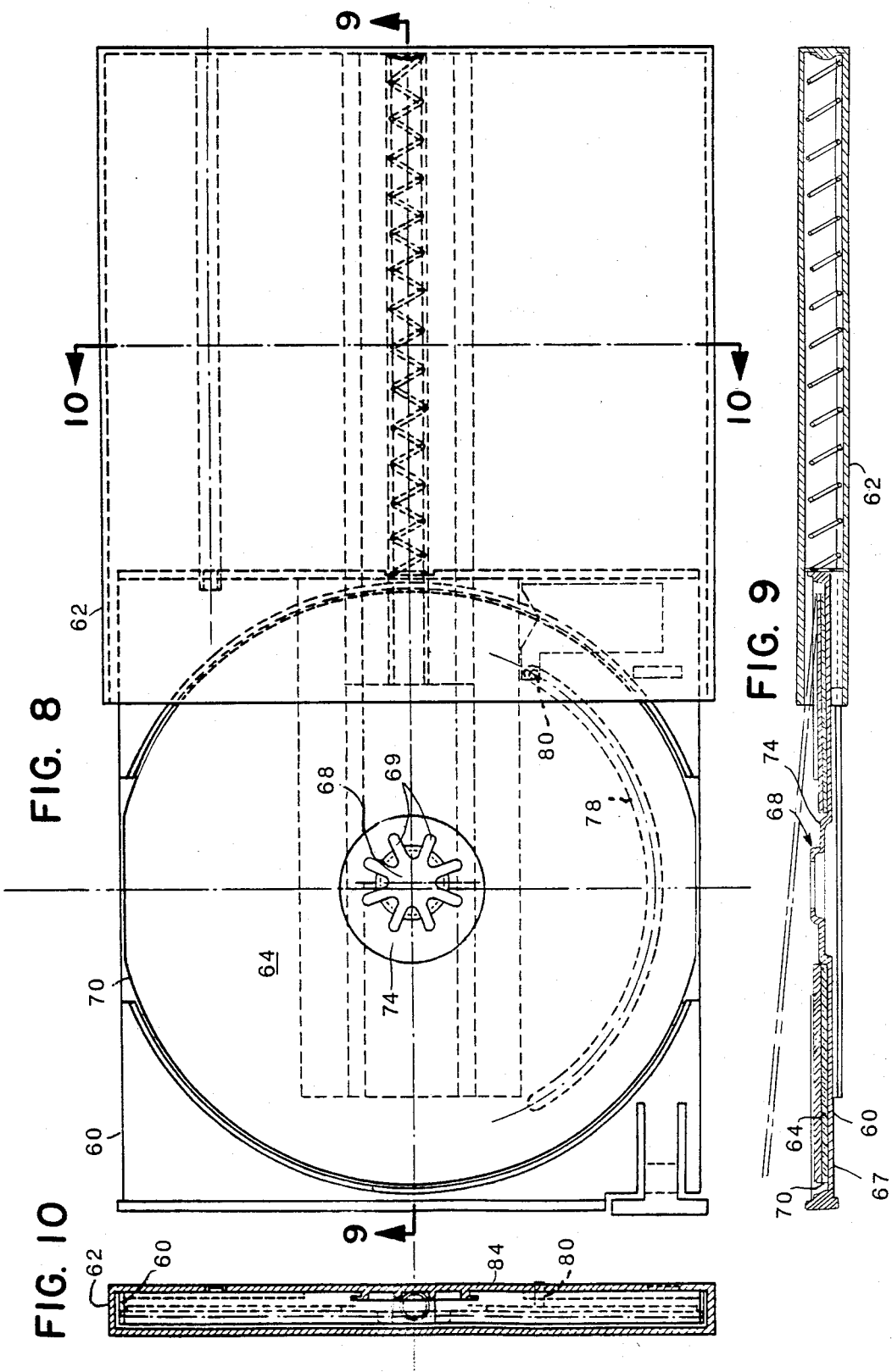

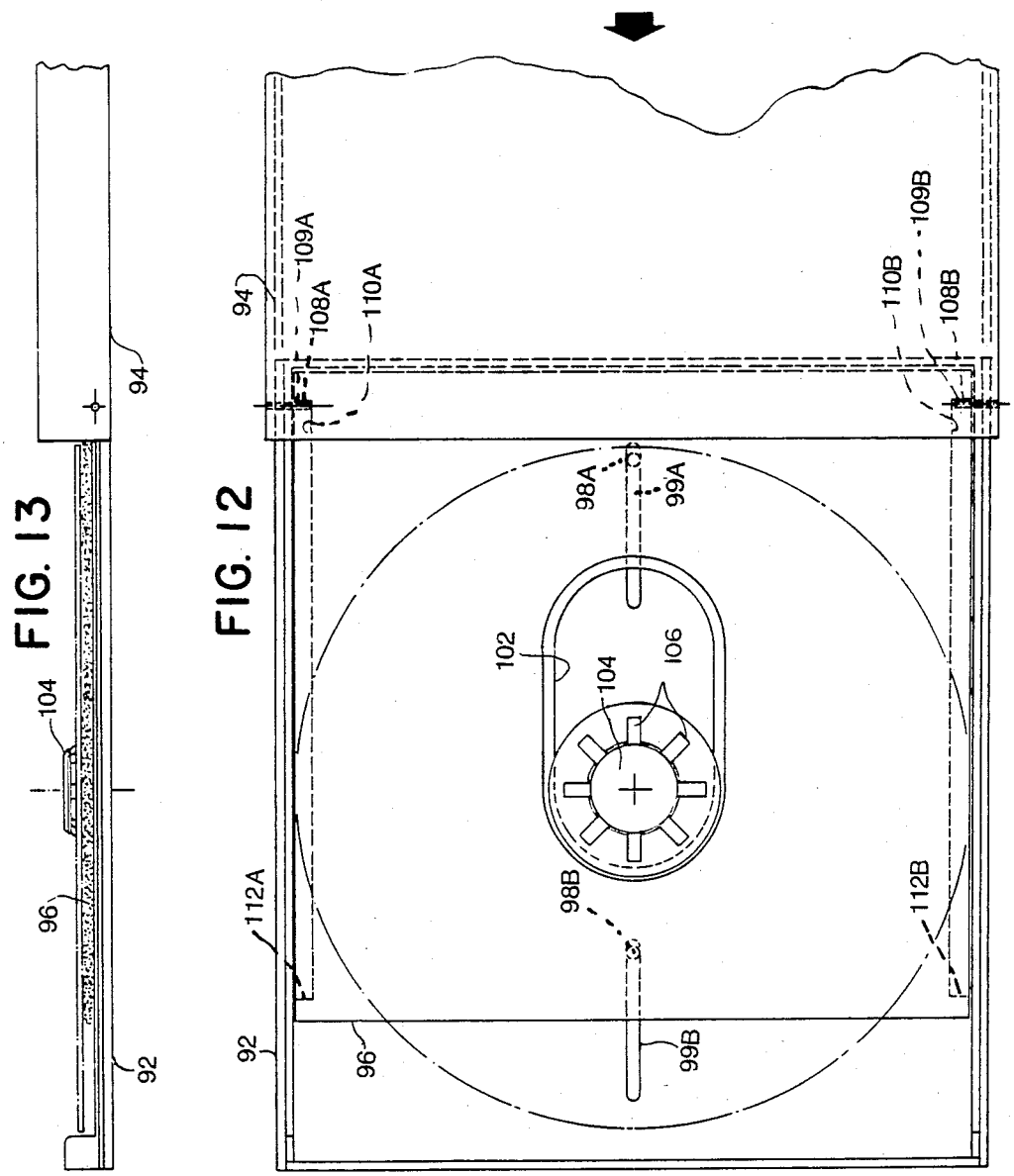

CLEANING DEVICE FOR DISCS

TECHNICAL FIELD

This invention relates to a cleaning device for discs or records, in particular discs or records having digital recordings which are read optically.

BACKGROUND ART

It is well known that discs or records must be cleaned regularly for good reproduction of the information thereon.

This is particularly so in the case of discs having digital recordings which are read optically by means of a laser beam because they are affected by grease spots from finger prints, or left from a wiping rag, which form a small lens on the transparent plastic protective coating which distorts the optical reading characteristics of the discs.

Numerous discs or record cleaning means have been proposed, e.g., sprays, liquid dispensers, brushes of all kinds, but in every case the user must carefully hold the disc or record for cleaning or introduce it into a device specially intended for its cleaning, which operation is difficult for the user to carry out.

DISCLOSURE OF INVENTION

Since discs or records are generally kept in storage containers, such as boxes, covers or sleeves, when not in use, it is the principal object of this invention to use such storage containers to effect cleaning of the discs or records.

A related object of this invention is to provide for cleaning the disc or record when it is located in a storage container using very simple and low cost cleaning devices within the storage container.

A more specific object of this invention is to provide a storage container having a cleaning device with which the disc or record is brought into contact so as to effect cleaning of the disc by a relative movement thereof with respect to the cleaning device.

Another object of the invention is to provide automatic means which cause relative movement of the cleaning device and a disc in a storage container.

A related object is to do away with the need for the user to clean a disc or record and enable a very high reproduction quality to be permanently obtained by causing the disc or record to be cleaned each time it is restored to or removed from its storage container.

A more specific object is to provide a storage container in the form of two half-boxes articulated on a common pivot and to utilize the opening or closing movement of one of the half-boxes with respect to the other to power the relative rotation of the disc and a cleaning device within the container.

Another more specific object of the invention is to provide a storage container with sliding sections and to utilize the sliding movement to cause an efficient cleaning of the disc.

BRIEF DESCRIPTION OF THE DRAWINGS

Other features of the invention will be apparent from the various exemplary embodiments described hereinbelow with reference to the accompanying drawings, wherein:

FIG. 4 is a plan view similar to FIG. 1 of a third embodiment of the invention;

FIG. 5 is a side view of the container shown in FIG. 4;

FIG. 6 is a plan view of another embodiment of the invention in which container sections are articulated on a common pivot, similar to FIG. 1, and have a disc cleaning member;

FIG. 7 is a sectional view substantially in the plane of lines 7—7 of FIG. 6;

FIG. 8 is a plan view of another embodiment of the invention and shows a storage container formed by sliding sections and having a disc cleaning member, with the container in the open position without a disc or record;

FIG. 9 is a sectional view substantially in the plane of lines 9—9 in FIG. 8 with the disc or record shown in phantom;

FIG. 10 is a sectional view substantially in the plane of the lines 10—10 in FIG. 8;

FIG. 12 is a plan view of another embodiment of the invention and shows a storage container formed by sliding sections and having a disc cleaning member;

FIG. 13 is a side view of the container shown in FIG. 12;

BEST MODES FOR CARRYING OUT THE INVENTION

Figure 1:
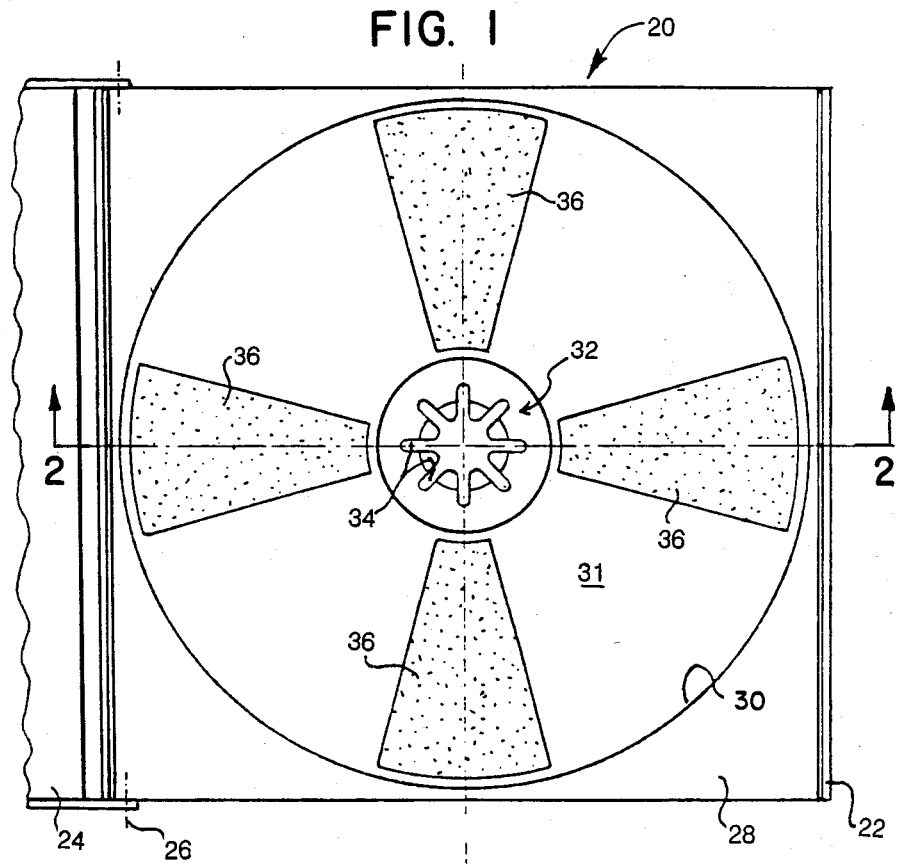
FIG. 1 is a plan view of a first embodiment of the cleaning device of this invention and shows a storage container and disc cleaning member formed by two half-boxes providing sections articulated on a common pivot, with the container shown in the open condition without a disc or record.
Figure 2:
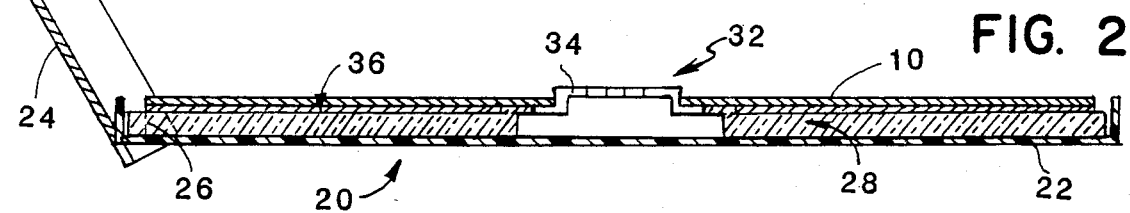
FIG. 2 is a sectional view substantially in the plane of lines 2—2 in FIG. 1.

Turning to the drawings, a first embodiment of the invention is shown in FIGS. 1 and 2 in the form of a disc storage container 20 having a cleaning member 36, the container being formed by two box-halves providing a bottom section 22 and a lid section 24 articulated about a common pivot 26 situated at one of their ends so that the lid section 24 may be opened and closed to allow a disc to be inserted or removed with the lid section open.

Within the bottom section 22 of the container 20 is provided a disc support 28, preferably of thermoformed plastic material, having a shallow, substantially circular recess 30 of a larger diameter than that of the disc positioned therein and providing a flat disc support surface 31. To maintain the disc within the recess 30, a disc holder 32 is provided, herein shown as a mandrel with flexible lugs 34 on which the disc is centered and held with the plastic coated surface of the disc on the underside and resting on the surface 31 of the recess 30, the lugs 34 frictionally engaging the center hole of the disc and holding it because they are flexible and of a slightly larger diameter than the disc center hole.

According to the invention, the disc cleaning member 36 is provided on the flat surface 31 of the disc support 28 and is preferably a fibrous pad made of a natural or synthetic cleaning material, e.g., velvet, cotton or a brush, extending either over the entire surface or over equally distributed segments as shown in FIG. 1.

After the user opens the lid section 24 to gain access to the disc, he simply applies pressure to the disc and turns it through a half or a full revolution to clean the surface by rotating the disc relative to the cleaning member 36.

Figure 3:
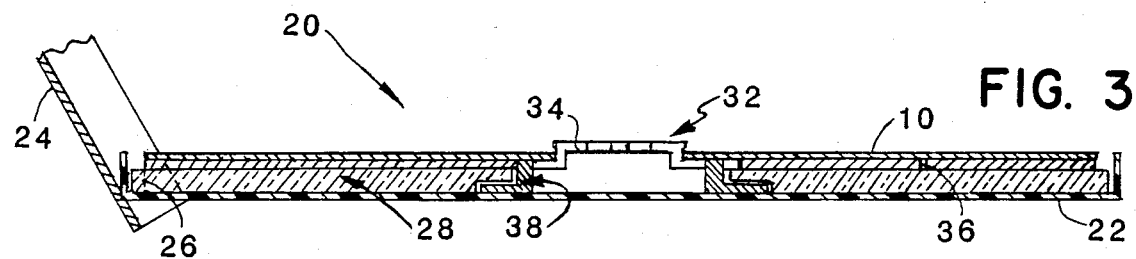
FIG. 3 is a sectional view similar to FIG. 2 but illustrating a second embodiment of the invention.

Since the flexible lugs 34 of the disc holder mandrel 32 apply a certain amount of holding pressure against the disc, frictional forces are advantageously reduced by providing, as shown in FIG. 3, a mandrel 32 which is not rigidly connected to the support 28 but mounted on a ring 38 centered relatively to the support and freely rotatable.

With a cleaning device so constructed, no special, complex or additional operation is required for the disc to be readily and advantageously cleaned after or before each playing operation.

Turning now to FIGS. 4 and 5, a third embodiment of the invention provides a storage container having a cleaning member 36 actuated automatically by opening and closing the disc storage container. Referring to the embodiment of the invention shown in FIG. 3 wherein the storage container has a bottom section 22 and a lid section 24 articulated on a common pivot 26, it is advantageous to make use of the relative movement of one section with respect to the other section in order to power automatically the cleaning of the disc. To this end, the disc holder mandrel 32, which is freely rotatable with respect to the disc support surface 31 and the cleaning member 36 thereon, is positively rotated to rotate the disc by coupling the opening and closing movement of the lid section 24 to the mandrel 32. The coupling connection comprises a gear 40 connected to the mandrel 32 which meshes with a rack 42 provided on a flat plate 44 which is horizontally slidable within a flat recess 45 in the base 45-A of the bottom section 22 of the container. The plate 44 is connected to the lid section 24 through the agency of a tongue 46. As a result, whenever the lid section 24 is raised or lowered, either for the removal or storage of a disc, the plate 44 is slid forward or back, rotating the gear 40 by means of the rack 42 and rotating the holder mandrel 32 and hence the disc with respect to the cleaning member 36 so as to clean the lower surface of the disc.

The gear 40 and the rack 42 can be so dimensioned that the disc is rotated one-half or one-third of a revolution on each operation of the lid section and, in that case, the cleaning device may be disposed either over the entire surface or over segments so distributed as to provide complete cleaning of the disc.

The rack 42 may alternatively drive the gear 40 only on one of the forward or return strokes, preferably on opening of the lid section, for cleaning the disc before removal from the storage container.

To rotate the disc with respect to the cleaning member, the rack and gear may alternatively be replaced by a wire winding around the holder mandrel and connected to a spring or belt.

Instead of the disc being freely rotatable and the cleaning member fixed, the alternative arrangement may be provided.

Referring now to FIGS. 6 and 7, another embodiment of the invention is shown in which, as in FIG. 1, the storage container 20 is formed by a two box-halves providing a bottom section 22 and a lid section 24. In this embodiment, according to the invention, a disc cleaning pad support 48 is mounted for translatory movement within the bottom section of the container. A fibrous cleaning pad provides a cleaning member 50 fastened on the surface of the support 48. Coupling means are provided, herein shown as an elongated element 52, interconnecting the lid section 24 and the support 48 such that as the lid section 24 is raised and lowered, the support 48 and cleaning member 50 are caused to move relatively longitudinally. A disc holder 54, including a mandrel 56 formed by flexible lugs 58 for engaging the center hole of a disc and holding the disc stationary, is mounted on the bottom section 22 of the container. Thus, a disc is held by the disc holder 54 against movement while the cleaning member is moved relatively to clean the surface of the disc. The support 48 and the member 50 have an elongated opening 51 to provide clearance for the fixed disc holder when the support 48 and member 50 are translated by opening or closing the lid section 24.

Figure 11:
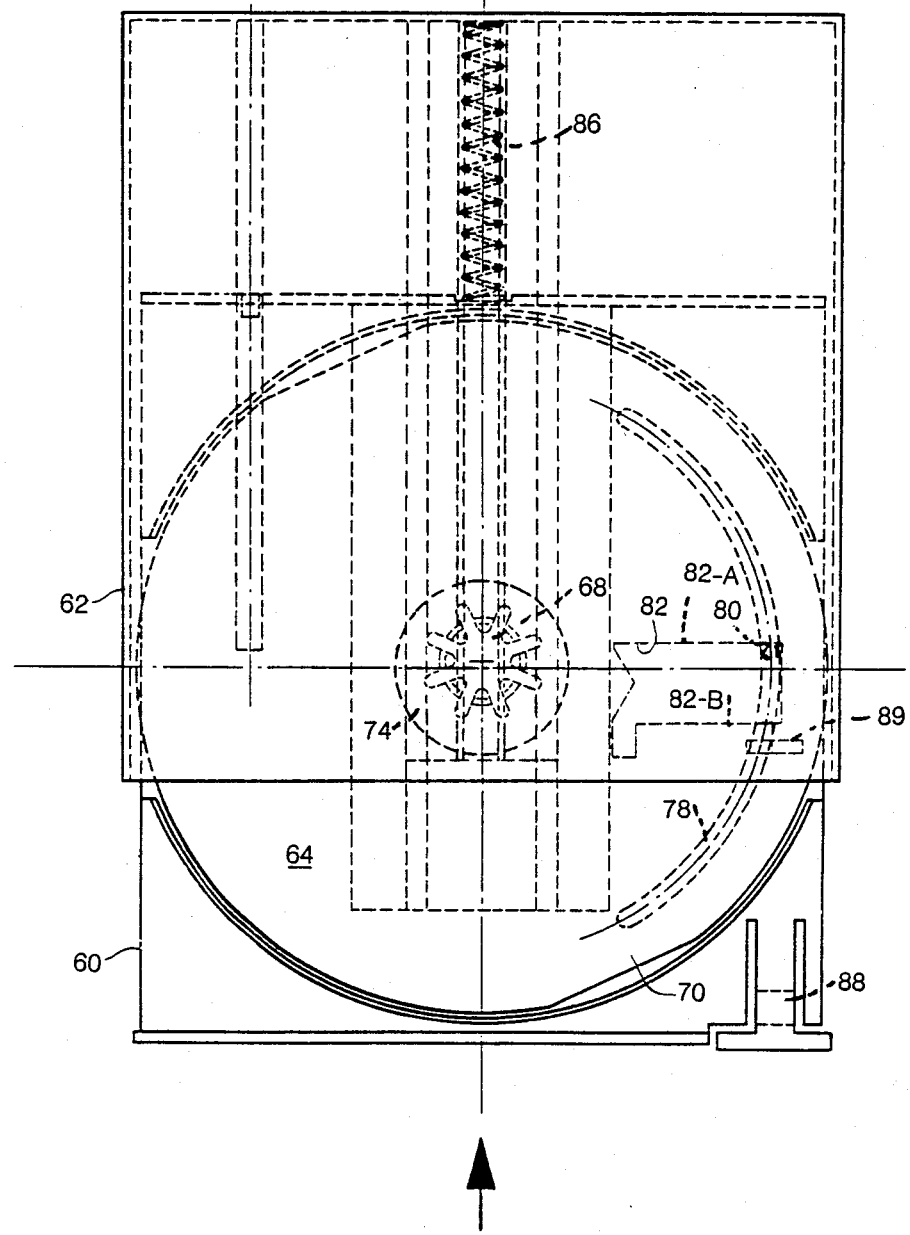
FIG. 11 is a plan view of the storage container shown in FIG. 8 in the partially closed position.
Figure 15:
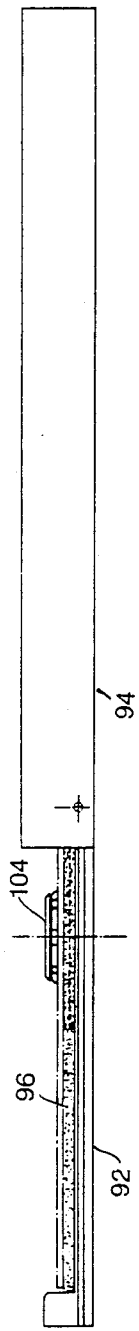
FIG. 15 is a side view of the container shown in the condition illustrated in FIG. 14.

Now turning to FIGS. 8-15, in accordance with the invention a disc cleaning device is provided by a storage container for discs formed by a drawer section 60 and a housing section 62. A cleaning member 64 is incorporated which is adapted to be moved relative to a disc for cleaning the disc as an incident to inserting the drawer section in or removing it from the housing section. Specifically referring to FIGS. 8-11, in this embodiment the relative movement of the drawer section 60 and the housing section 62 (which serves as a cover or "lid" over a disc in the drawer section) is utilized to rotate the cleaning member 64 relative to a disc which is held stationary in the drawer section 60 within the storage container for cleaning the disc. For this purpose, the bottom 67 of the drawer section 60 has mounted therein a mandrel 68 having a plurality of flexible lugs 69 which, as in the disc holder means described earlier, are adapted to engage the center hole of a disc and frictionally hold the disc stationary and against rotary movement. The drawer section 60 includes a rotatably mounted disc support 70 and on the surface of the disc support 70 is fastened a cleaning member 64, such as a fibrous cleaning pad, although a number of pad segments may be used, if preferred. The disc support 70, referring to FIGS. 8 and 11, is carried for rotation about a hub 74 mounted eccentrically of the axis of the mandrel 68. By this provision, any scratch on the surface of the disc produced by a particle trapped in the cleaning member would describe a path traversing the recording tracks on the disc and would avoid circular scratches aligned with the recording tracks and thereby avoid any possibility of producing scratches affecting the optical reading of the recording tracks.

To rotate the disc support 70 and cleaning member 64 carried thereby, the bottom 67 of the drawer section 60 is provided with a curved slot 78, as seen in FIGS. 8 and 11, while the disc support 70 is provided with a pin 80 which extends downwardly below the disc support 70 through the curved slot 78 into an L-shaped cut 82 in the bottom panel 84 of the housing section 62 of the storage container. When the drawer section 60 is moved inward and outward relative to the housing section 62, the pin 80 is brought to bear against the lateral edges 82-A, 82-B of the cut 82, which has the effect of a cam to rotate the disc support 70 about its axis in one direction and then return and thereby rotate the cleaning member against the surface of the disc. A coil spring 86 is effective to return the drawer section 60 outwardly and the drawer section may be held in its inward position by a resilient latch member 88 which is adapted to be inserted in a recess 89 in the bottom panel of the housing section. As shown in FIG. 11, the disc support has been rotated approximately 60 degrees from the position of FIG. 8 due to the coupling between the disc support 70 and the drawer section 60 which carries the disc and which acts to rotate the cleaning member and the disc relative to one another, for cleaning the disc, as an incident to the translatory movement of the drawer section.

Figure 14:
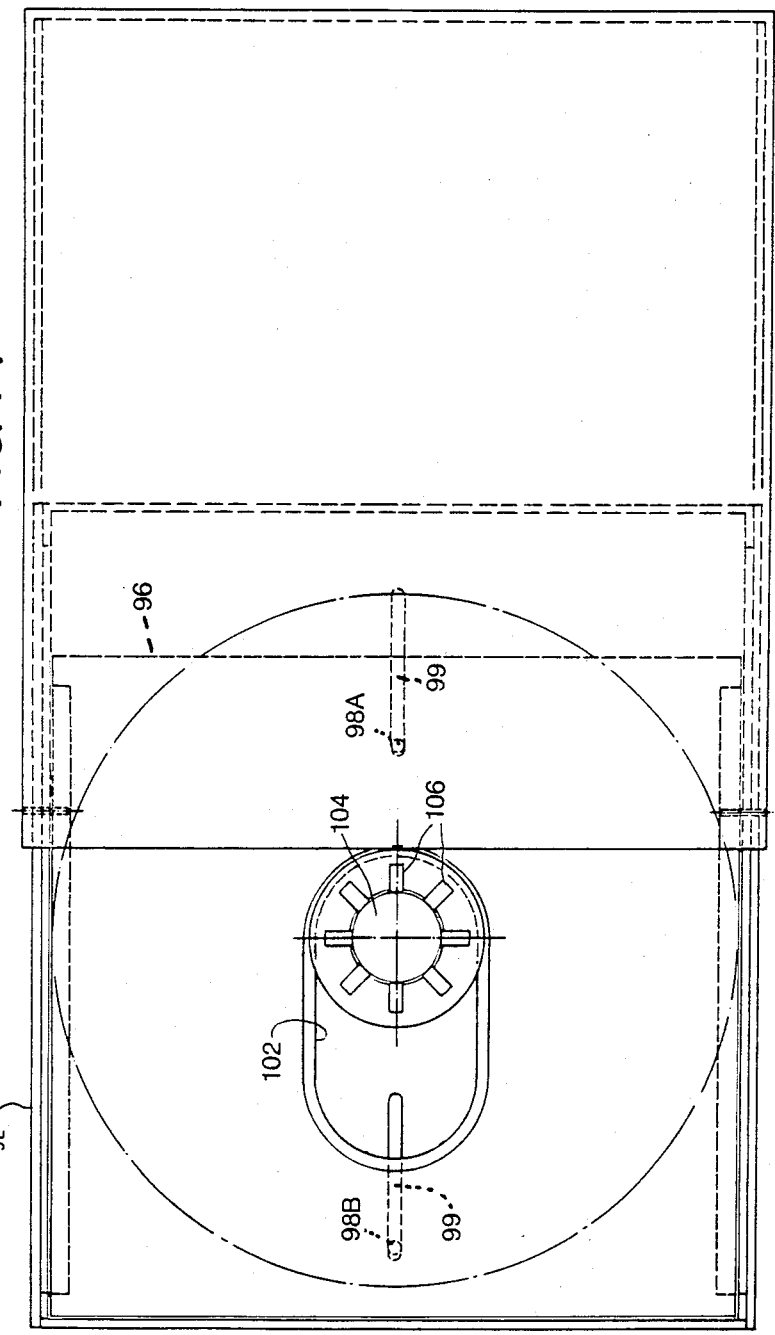
FIG. 14 is a plan view similar to FIG. 12 with the sliding sections in partially closed condition.

Further in accordance with the invention, means are provided, as shown in FIGS. 12-14, for causing translatory movement of a cleaning member 90 relative to a disc for cleaning the disc as an incident to moving a drawer section 92 of a storage container to insert in or remove a disc from the container. In this embodiment of the invention, the drawer section 92 is slidable within a housing section 94 which provides a cover or "lid" to the drawer section when the latter is fully inserted, and the drawer section 92 and housing section 94 provide the storage container. A movable disc support and cleaning member 96 is carried on the drawer section 92 and is movable longitudinally relative to the drawer section 92, the movement being defined by a pair of pins 98A, 98B which extend downwardly from the disc support and cleaning member 96 into a pair of narrow, aligned longitudinal slots 99A, 99B in the bottom of the drawer section 92. The disc support and cleaning member 96 also has a wide longitudinal opening 102 which provides clearance with a disc holder mandrel 104, allowing the disc support and cleaning member 96 to move longitudinally relative to the drawer section 92. A disc is held stationary within the drawer section 92 by flexible lugs 106 of the mandrel 104 which engage in the center hole of a disc and frictionally hold the disc. Referring to FIG. 12, which shows the drawer section 92 in its outward position, a pair of fixed pins 108-A, 108-B on the lateral edges of the housing section 94 project inwardly into slots 110-A, 110-B in the outer edges of the disc support and cleaning member 96. As the drawer moves to its outer position (FIG. 12), the pins 108-A, 108-B abut the ends 109-A, 109-B of the slots 110-A, 110-B and shift the disc support and cleaning member 96 to an inward position spaced from the outer end of the drawer section. In this position of the drawer section (FIG. 12), a disc may be removed from and another disc placed in the drawer section and snapped into position on the lugs of the disc holder mandrel 104. As the drawer section is moved inward, the fixed pins 108-A, 108-B will be engaged by the other ends 112-A, 112-B of the slots 110-A, 110-B and cause the cleaning member pad on the disc support to move longitudinally within the drawer section for cleaning the disc.

In this form of the invention, the cleaning member 96 is moved twice for cleaning the disc at the extremes of movement of the drawer section 92. It will be seen that the disc support and cleaning member 96 is positioned in FIGS. 14 and 15 in the course of movement of the drawer section 92 outward and with the cleaning member in its outward position relative to the drawer section. In FIG. 12, the cleaning member 96 is shown in the inward position after it has been shifted for cleaning the disc. One cleaning movement of the member 96 occurs between the position of the drawer section shown in FIG. 14 and the position shown in FIG. 12. The other cleaning movement occurs when the drawer section 92 reaches its inward position, not shown in the drawings.

I claim:

1. A cleaning device for discs or records having a center hole comprising, in combination, a disc storage container including a pair of box-halves providing a bottom section and a lid section, a support carried by and providing a support surface within said bottom section of said storage container, a cleaning member on said support surface within said bottom section adapted to engage the face of a disc placed on said cleaning member, and means carried by said bottom section of said storage container comprising a mandrel for engaging the periphery of the center hole of a disc placed on said member, said support and said mandrel being carried within said bottom section of said container for relative rotational movement, and said mandrel providing means for holding said disc in contact with said cleaning member while said disc and cleaning member are rotated relative to one another for cleaning the entire face of the disc by said cleaning member.

2. A device according to claim 1 wherein said cleaning member is fixed within said bottom section of the container and said disc holding means allows movement of the disc with respect to the cleaning member.

3. A device according to claim 2 wherein said mandrel is freely rotatable with respect to said support surface hole which allows rotation of the disc with respect to the cleaning member.

4. A device according to claim 1 wherein said support surface and said cleaning member thereon are rotationally movable relative to the disc, and said disc holding madrel holds said disc against movement.

5. A device according to claim 4 wherein the axis of rotation of said support and said cleaning member is offset from the axis of a disc held by said disc holding mandrel.

6. A cleaning device for discs or records comprising, in combination, a disc storage container including a pair of relatively movable sections, a support providing a support surface in said storage container, a cleaning member on said support surface, means engaging a disc for holding said disc in contact with said cleaning member, said cleaning member and said disc being relatively movable, and means coupling said sections to produce relative movement of the cleaning member and the disc for cleaning the disc upon relative movement of said sections.

7. A device according to claim 6 wherein said pair of relatively movable sections include two box-halves articulated about a common pivot to open and close said container, and said coupling means includes an element operably connected to respond to the movement of one box-half with respect to the other to rotate the disc relative to the cleaning member for cleaning the disc.

8. A device according to claim 6 wherein said coupling means includes a rack connected to one section of the container and a gear engaging said rack and connected to said disc holding means for producing relative movement of said cleaning member and said disc upon relative movement of said container sections.

9. A device according to claim 6 wherein said pair of relatively movable sections include two box-halves articulated about a common pivot to open and close said container and said coupling means includes an element operably connected to respond to the movement of one box-half with respect to the other to move the cleaning member relative to the disc for cleaning the disc.

10. A device according to claim 6 wherein one of said container sections comprises a drawer section and another comprises a housing section, and said coupling means includes a cam coupled to rotate said cleaning member relative to a disc upon translatory movement of the drawer section relative to the housing section.

11. A device according to claim 10 wherein the cleaning member is rotationally mounted eccentrically of the axis of the disc in the drawer section.

12. A device according to claim 6 wherein one of said container sections comprises a drawer section mounted for translatory movement relative to the other section, and said movable drawer section is coupled to produce movement of the cleaning member with respect to the disc for cleaning the disc.

13. A device according to claim 6 wherein relative movement of said sections produces relative rotation of said cleaning member and disc through a predetermined angle and said cleaning member includes segments of fibrous pad uniformly distributed on said disc support surface to clean the entire surface of said disc upon relative rotation of the disc and cleaning member through said predetermined angle.

14. A device according to claim 6 wherein the relative movement of said sections produces rotation of the disc with respect to the cleaning member for cleaning the disc.

15. A device according to claim 6 wherein the relative movement of said sections produces rotation of the cleaning member with respect to the disc for cleaning the disc.

16. A device according to claim 6 wherein the relative movement of said sections produces translatory movement of the cleaning member with respect to the disc for cleaning the disc.

17. A device according to claim 6 wherein said container sections are mounted for relative translatory movement and the cleaning member and the disc are mounted for relative rotational movement.

18. A device according to claim 6 wherein said container sections are mounted for relative pivotal movement and the cleaning member and the disc are mounted for relative translatory movement.

19. A device according to claim 6 wherein said container sections are mounted for relative pivotal movement and the cleaning member and the disc are mounted for relative rotational movement.

20. A device according to claim 19 wherein said cleaning member is fixed and the disc is mounted for rotational movement.

21. A device according to claim 19 wherein said disc is fixed and the cleaning member is mounted for rotational movement.

* * * * *